United States Patent
Yamabe (10) Patent No.: US 7,999,553 B2
(45) Date of Patent: Aug. 16, 2011

(54) VOLTAGE MEASUREMENT DEVICE AND ELECTRIC VEHICLE

(75) Inventor: Norito Yamabe, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 949 days.

(21) Appl. No.: 11/938,193

(22) Filed: Nov. 9, 2007

(65) Prior Publication Data

US 2008/0202830 A1 Aug. 28, 2008

(30) Foreign Application Priority Data

Nov. 21, 2006 (JP) .................. 2006-314773

(51) Int. Cl.
*G01N 27/416* (2006.01)
(52) U.S. Cl. ......... 324/433; 324/428; 324/429; 324/434
(58) Field of Classification Search .................. 320/132; 324/428, 429, 433, 434
See application file for complete search history.

(56) References Cited

U.S. PATENT DOCUMENTS

| | | | |
|---|---|---|---|
| 2003/0189419 A1* | 10/2003 | Maki et al. ................ | 320/166 |
| 2005/0225290 A1 | 10/2005 | Hashimoto | |

FOREIGN PATENT DOCUMENTS

| | | |
|---|---|---|
| JP | 11-248755 A | 9/1999 |
| JP | 2005-322617 A | 11/2005 |
| JP | 2005-328642 A | 11/2005 |

OTHER PUBLICATIONS

Notice of Grounds for Rejection mailed Oct. 5, 2010, issued in corresponding Japanese Patent No. 2006-314773, filed Nov. 21, 2006, and English Excerpt from Notice of Grounds for Rejection provided by Japanese foreign associate, 4 pages.

* cited by examiner

*Primary Examiner* — Edward Tso
*Assistant Examiner* — Samuel Berhanu
(74) *Attorney, Agent, or Firm* — Christensen O'Connor Johnson Kindness PLLC (57) ABSTRACT

To provide a voltage measurement device for measuring a battery voltage of a secondary battery formed by serially connecting a plurality of battery blocks, which is able to calculate the battery voltage in block units even though a potential detection line is disconnected. Specifically, when the voltage detection unit fails to measure the battery voltage of the measurement target battery block by selecting potential detection lines connected to both terminals of the measurement target battery block, the switch control unit selects the potential detection lines connected to both terminals of the battery block group including a serially connected plurality of battery blocks including the measurement target battery block, then measures the integrated voltage of the battery block group, and measures the battery voltage of the measurement target battery block based on the measured integrated voltage.

4 Claims, 4 Drawing Sheets

| ALL NORMAL POTENTIAL DETECTION LINES | | | | |
|---|---|---|---|---|
| MEASUREMENT TARGET BLOCK | IN CHARGING CAPACITOR | | IN MEASURING | |
| B1 | SW1 | SW2 | SWa | SWb |
| B2 | SW3 | SW2 | SWa | SWb |
| B3 | SW3 | SW4 | SWa | SWb |
| B4 | SW5 | SW4 | SWa | SWb |
| B5 | SW5 | SW6 | SWa | SWb |
| B6 | SW7 | SW6 | SWa | SWb |
| ⋮ | ⋮ | ⋮ | ⋮ | ⋮ |
| B2n-1 | SW2n-1 | SW2n | SWa | SWb |
| B2n | SW2n+1 | SW2n | SWa | SWb |

Fig. 3B

| ABNORMAL POTENTIAL DETECTION LINE L2 | | | | |
|---|---|---|---|---|
| MEASUREMENT TARGET BLOCK | IN CHARGING CAPACITOR | | IN MEASURING | |
| B1 | SW1 | SW4 | SWc | SWd |
| B2 | SW1 | SW4 | SWc | SWd |
| B3 | SW3 | SW4 | SWa | SWb |
| B4 | SW5 | SW4 | SWa | SWb |
| B5 | SW5 | SW6 | SWa | SWb |
| B6 | SW7 | SW6 | SWa | SWb |
| ⋮ | ⋮ | ⋮ | ⋮ | ⋮ |
| B2n-1 | SW2n-1 | SW2n | SWa | SWb |
| B2n | SW2n+1 | SW2n | SWa | SWb |

Fig. 3C

| ABNORMAL POTENTIAL DETECTION LINE L5 | | | | |
|---|---|---|---|---|
| MEASUREMENT TARGET BLOCK | IN CHARGING CAPACITOR | | IN MEASURING | |
| B1 | SW1 | SW2 | SWa | SWb |
| B2 | SW3 | SW2 | SWa | SWb |
| B3 | SW3 | SW4 | SWa | SWb |
| B4 | SW7 | SW4 | SWc | SWd |
| B5 | SW7 | SW4 | SWc | SWd |
| B6 | SW7 | SW6 | SWa | SWb |
| ⋮ | ⋮ | ⋮ | | |
| B2n-1 | SW2n-1 | SW2n | SWa | SWb |
| B2n | SW2n+1 | SW2n | SWa | SWb |

Fig. 4

VOLTAGE MEASUREMENT DEVICE AND ELECTRIC VEHICLE

PRIORITY INFORMATION

This application claims priority from Japanese Patent Application No. 2006-314773 filed on Nov. 21, 2006, which is incorporated herein by reference in its entirety.

BACKGROUND OF THE INVENTION

1. Field of the Invention

The present invention relates to a voltage measurement device for measuring battery voltages of serially connected battery blocks, and an electric vehicle having the voltage measurement device.

2. Description of the Related Art

A high output power source of a few hundred volts to be mounted in an electric vehicle, such as a hybrid electric vehicle or the like, comprises a plurality of serially connected battery modules, such as a nickel-metal hydride (nickel-metalhydride) secondary battery, a lithium ion secondary battery, or the like. A battery voltage of a secondary battery is used as a parameter to control charge/discharge of such a secondary battery.

Japanese Patent Laid-open Publication No. Hei 11-248755 discloses a measurement device for measuring a battery voltage of serially connected battery blocks in battery block units.

Japanese Patent Laid-open Publication No. 2005-328642 discloses a device for equalizing the capacitance of battery blocks based on the battery voltages measured in battery block units.

The device for measuring a battery voltage in battery block units as disclosed in the above-mentioned Japanese Patent Laid-open Publications No. Hei 11-248755 and No. 2005-328642 cannot measure the battery voltage of some serially connected battery blocks in the event that the potential detection line is disconnected or the like. This may cause a problem, for example, in calculation of the capacitance of the respective battery blocks. However, if measurement target secondary battery is functioning normally, it may sometimes be desirable, for example, for the secondary battery to continuously charged/discharged so that the equalization control can be continued.

The present invention aims to provide a voltage measurement device for measuring a battery voltage of a secondary battery formed by serially connecting a plurality of battery blocks, which can measure a battery voltage in battery block units should the potential detection line be disconnected or the like.

SUMMARY OF THE INVENTION

According to one aspect of the present invention, there is provided a voltage measurement device for measuring an inter-terminal voltage of each of a serially connected plurality of battery blocks, in battery block units, comprising a voltage detection unit for detecting the inter-terminal voltage of a measurement target battery block, and for detecting, when the inter-terminal voltage of the measurement target battery block can not be detected, an integrated voltage of a battery block group comprising the plurality of battery blocks including the measurement target battery block, and calculating the inter-terminal voltage of the measurement target battery block based on a number of the battery blocks included in the battery block group and the integrated voltage.

In the above, the battery block group may comprise a minimum number of battery blocks of which voltage is able to be detected.

In the above, the voltage measurement device may further comprise a plurality of potential detection lines respectively connected to respective connection points between both ends of the plurality of battery blocks and respective battery blocks; a first multiplexer circuit for selectively connecting any one of odd-numbered potential detection lines of the potential detection lines, counted from one end of the plurality of battery blocks to a first potential detection terminal; and a second multiplexer circuit for selectively connecting any one of even-numbered potential detection lines of the potential detection lines, counted from the one end to a second potential detection terminal, wherein the voltage detection unit connects, when the inter-terminal voltage of the measurement target battery block can not be detected, the odd-numbered potential detection line and the even-numbered potential detection line, connected to the two ends of the battery block group, to the first potential detection terminal and the second potential detection terminal via the first multiplexer circuit and the second multiplexer circuit, respectively, to detect a potential difference between the first potential detection terminal and the second potential detection terminal to thereby detect the integrated voltage, and the minimum number of battery blocks of which voltage can be detected is an odd number equal to or larger than three.

According to another aspect of the present invention, there is provided an electric vehicle, comprising a secondary battery formed using a plurality of serially connected battery blocks;

a motor generator for receiving power from the secondary battery and driving the electric vehicle to run; a voltage measurement device for detecting an inter-terminal voltage of a measurement target battery block, and for detecting, when the inter-terminal voltage of the measurement target battery block cannot be detected, an integrated voltage of a battery block group comprising the plurality of battery blocks including the measurement target battery block, and calculating the inter-terminal voltage of the measurement target battery block based on a number of the battery blocks included in the battery block group and the integrated voltage, and a control unit for controlling such that power supply from the secondary battery to the motor generator can be continued, based on the inter-terminal voltage of each battery block, supplied from the voltage measurement device, when the inter-terminal voltage of the measurement target battery block can be calculated based on the number and the integrated voltage even though the voltage measurement device is unable to detect the inter-terminal voltage of the measurement target battery block.

According to the present invention, even when a battery voltage cannot be measured in battery block units due to disconnection or the like occurring in a potential detection line or the like, the battery voltage of the battery block can be indirectly measured based on the integrated voltage of a plurality of battery blocks containing the battery block for which battery voltage cannot be measured.

DESCRIPTION OF THE PREFERRED EMBODIMENTS

The best mode for rendering the present invention into practice (hereinafter referred to as an embodiment) will be described based on the following drawings.

Figure 1:
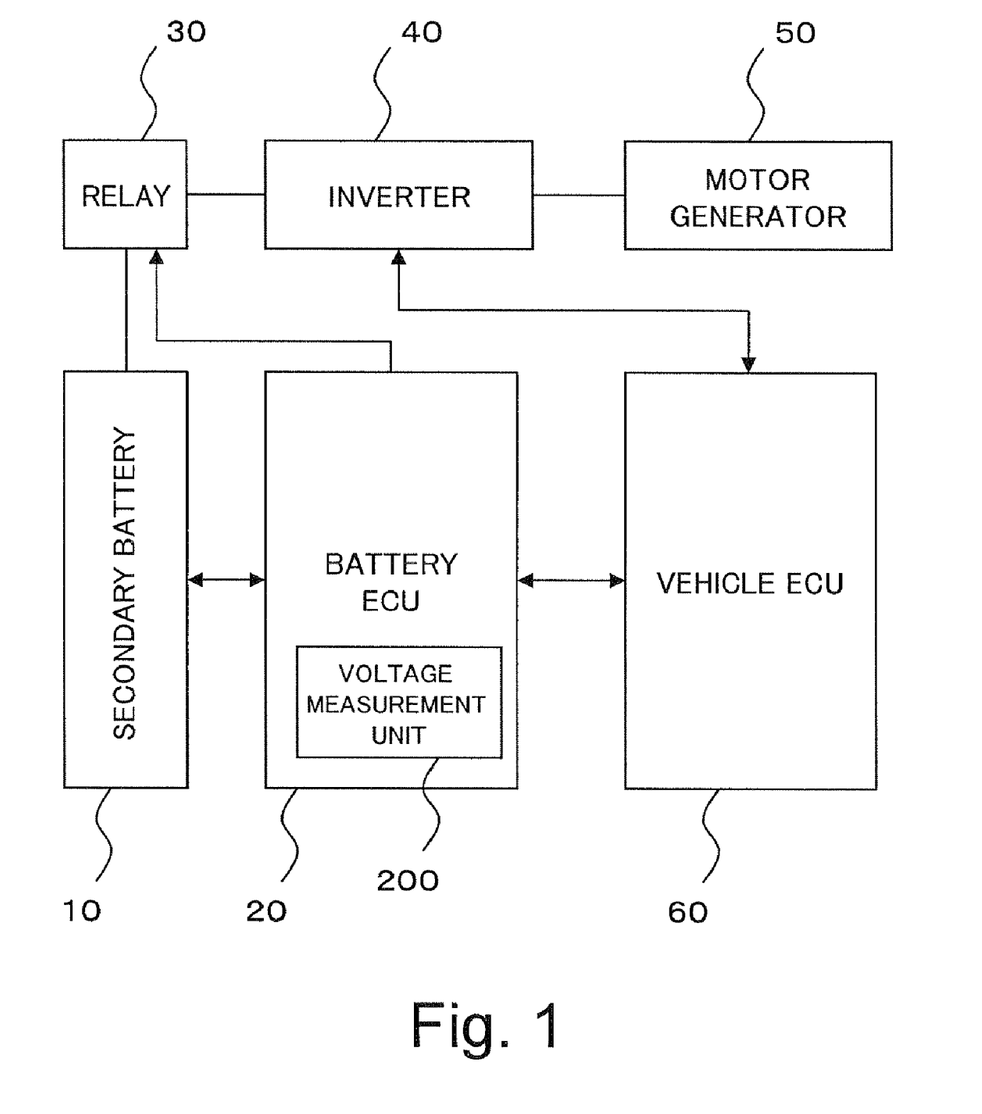
FIG. 1 is a diagram schematically showing an electric vehicle according to an embodiment of the present invention, which has a secondary battery mounted therein for powering a drive source.

FIG. 1 is a diagram schematically showing a structure of a pure electric vehicle (PEV) having a secondary battery mounted therein for powering the drive source. Here, although a pure electric vehicle (PEV) is described as an example in this embodiment, the present invention can be applied to any system for measuring a battery voltage of a secondary battery, for example, an electric vehicle, such as a hybrid electric vehicle (HEV) having an engine and a secondary battery, a hybrid vehicle having a fuel cell and a secondary battery, and so forth.

The pure electric vehicle comprises a secondary battery 10, a battery electronic control unit (hereinafter referred to as a battery ECU) 20, a relay 30, an inverter 40, a motor generator 50, and a vehicle electronic control unit (hereinafter referred to as a vehicle ECU) 60.

The battery ECU 20 incorporates a voltage measurement unit 200 (a voltage measurement device) for measuring the battery voltage V of the secondary battery 10. The battery ECU 20 calculates a state of charge (hereinafter referred to as SOC (State of Charge)) of the secondary battery 10 based on a battery voltage V, a charge/discharge current I, battery temperature T, and so forth. The battery ECU 20 sends the battery information, such as the SOC, the battery temperature, and so forth, of the secondary battery 10 to the vehicle ECU 60. The battery ECU 20 also controls opening and closing of the switch element of the relay 30 based on the battery voltage V. The vehicle ECU 60 controls the inverter 40 based on the various kinds of battery information to thereby control charge/discharge of the secondary battery 10.

The thus structured pure electric vehicle converts DC power from the secondary battery 10 to AC power via the inverter 40 under control of the battery ECU 20 and the vehicle ECU 60 to drive the motor generator 50, whereby the pure electric vehicle runs.

Figure 2:
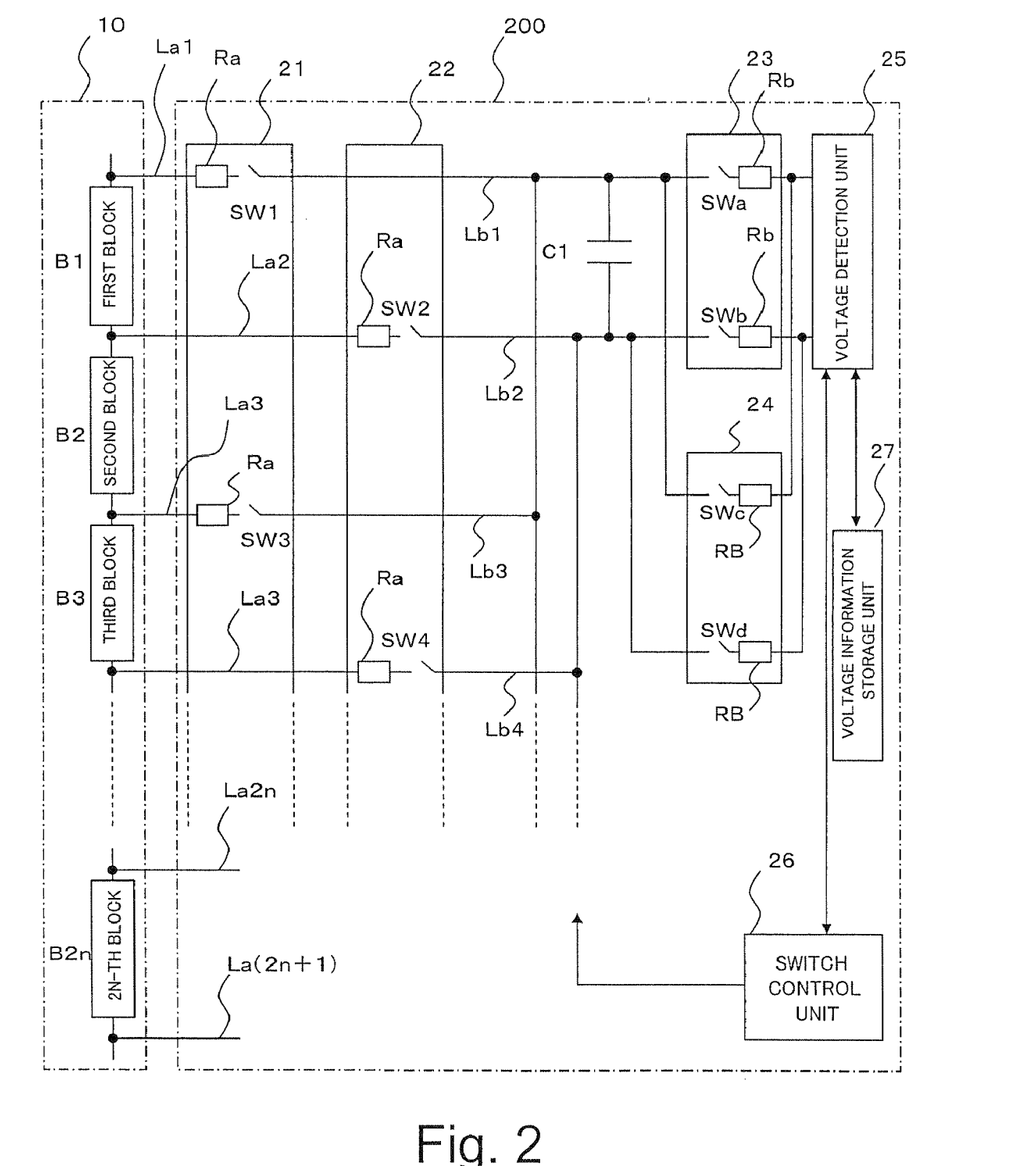
FIG. 2 is a diagram mainly showing a voltage measurement unit for measuring the battery voltage of the secondary battery among the functional blocks mounted inside a battery ECU.

FIG. 2 is a diagram mainly showing the voltage measurement unit 200 for measuring the battery voltage of the secondary battery 10 among the function blocks incorporated in the battery ECU 20.

In FIG. 2, the secondary battery 10 comprises serially connected of battery blocks of 2n in number. Each of the battery blocks comprises two serially and electrically connected battery modules, and each battery module comprises six electrically and serially connected electric cells. An electric cell may be a nickel-metal hydride battery, a lithium ion battery, or the like. It should be noted that the number of battery blocks, battery modules, and electric cells are not particularly limited. The structure of the secondary battery is also not limited to the one described above.

The voltage measurement unit 200 measures the battery voltage of each battery block by detecting the amount of electric charge stored in the capacitor C1.

As shown in FIG. 2, the respective terminals of the battery blocks B1 to B2$n$ are connected to the respective potential detection lines La1 to La(2$n$+1), each for each.

A first multiplexer 21 has the (n+1) number of switches SW1, SW3, to SW(2$n$+1), in which the odd numbered potential detection lines La1, La3, to La(2$n$+1) among the potential detection lines La1 to La(2$n$+1), counted from one end of the battery block, are connected to the respective one ends of the switches SW1, SW3, and SW(2$n$+1) via resistances Ra.

Meanwhile, a second multiplexer 22 has switches SW2, SW4, to SW2$n$ of n in number, in which the even numbered potential detection lines La2, La4, to La2$n$ are connected to respective one ends of the switches SW2, SW4, to SW2$n$ via the resistances Ra.

The other ends of the switches SW1, SW3, to SW(2$n$+1) of the first multiplexer 21 are connected to respective one ends of the potential detection lines Lb1, Lb3, to Lb(2$n$+1), other ends of which are commonly connected to one end (corresponding to the first potential detection terminal) of the capacitor C1.

Meanwhile, the other ends of the switches SW2, SW4, to SW2$n$ of the second multiplexer 22 are connected respective one ends of the potential detection line Lb2, Lb4, to Lb2$n$, of which other ends are commonly connected to the other end (corresponding to the second potential detection terminal) of the capacitor C1.

The capacitor C1 is connected via the first sample switch 23 to a voltage detection unit 25. More specifically, one end of the capacitor C1 is connected to one end of a switch SWa of the first sample switch 23, the other end of which is connected via a resistance Rb to the voltage detection unit 25. Meanwhile, the other end of the capacitor C1 is connected to one end of the switch SWb of the first sample switch 23, the other end of which is connected via a resistance Rb to the voltage detection unit 25.

A second sample switch 24 is connected in parallel to the first sample switch 23, so that the capacitor C1 is connected to the voltage detection unit 25 via the second sample switch 24 in addition to the first sample switch 23. More specifically, one end of the capacitor C1 is connected to one end of a switch SWc of the second sample switch 24, the other end of which is connected via a resistance RB having a higher resistance value (for example, 30 k$\Omega$) than that of the resistance Rb (for example, 10 k$\Omega$) to the voltage detection unit 25. Meanwhile, the other end of the capacitor C1 is connected to one end of a switch SWd of the second sample switch 24, the other end of which is connected via a resistance RB to the voltage detection unit 25.

The switch control unit 26 carries out on/off control relative to the respective switches SW of the above-described first and second multiplexers and the first and second sample switches so that the voltage detection unit 25 can sequentially measure the battery voltage (an inter-terminal voltage) in battery block units, beginning with the battery block B1.

Figure 3A:
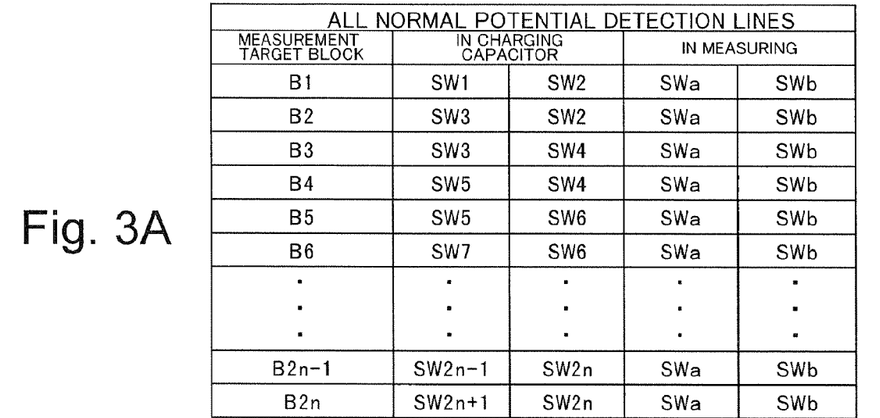
FIG. 3A is a diagram showing a switch control map to be referred to by the switch control unit with the potential detection line in normal operation.

FIG. 3A shows a switch control map to be referred to by the switch control unit 26. As shown in FIG. 3A, for example, the switches SW1, SW2 are closed, and kept closed, for a predetermined period of time, whereby the battery block B1 is selected, so that the capacitor C1 is charged with the battery voltage Vb1 of the battery block B1. Then, the switches SW1, SW2 are opened and the switches SWa, SWb are closed, and kept closed, for a predetermined period of time, whereby the charge voltage of the capacitor C1, that is, the battery voltage Vb1 of the battery block B1, is input to the voltage detection unit 25. The voltage detection unit 25 measures the battery voltage Vb1, and registers the voltage data indicative of the battery voltage Vb1 in the voltage information storage unit 27. Thereafter, the switches SWa, SWb are opened and the switches SW3, SW2 are closed, and kept closed, for a predetermined period of time, the battery block B2 is selected, so that the capacitor C1 is charged with the battery voltage Vb2 of the battery block B2. Then, the switches SW3, SW2 are opened and the switches SWa, SWb are closed, and kept closed, for a following predetermined period of time, the charge voltage of the capacitor C1, that is, the battery voltage Vb2 of the battery block B2, is input to the voltage detection unit 2. As the polarity of the battery voltage Vb2 is a reversal of that of the battery voltage Vb1, the voltage detection unit 25 reverses the polarity of the input battery voltage Vb2, and registers the voltage data indicating the battery voltage Vb2 in the voltage information storage unit 27.

That is, a battery voltage can be similarly measured in battery block units by carrying out on/off control of the switch SW, while referring to the switch control map shown in FIG. 3A.

In this embodiment, the respective switches SW are controlled as described above so that the battery voltage of the respective battery blocks can be measured should the potential detection line be partially disconnected.

Figure 3B:
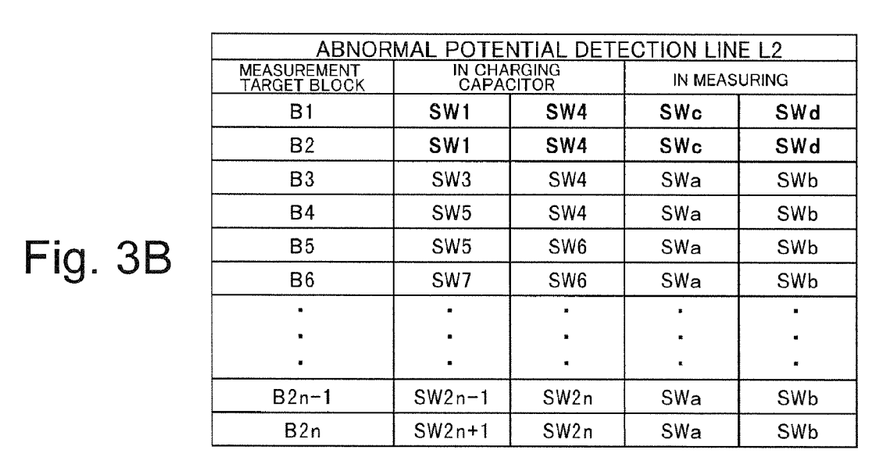
FIG. 3B is a diagram showing one example of a switch control map to be referred to by the switch control unit when any abnormality, such as disconnection or the like, occurs on a specific potential detection line.

FIG. 3B shows a switch control map to be referred to by the switch control unit 26 when the battery voltages of the battery blocks B1 and B2 cannot be measured due to the occurrence of an abnormality, such as disconnection or the like, of the potential detection line La2 and/or the potential detection line Lb2. As shown in FIG. 3B, the switches SW1, SW4 are kept closed for a predetermined period of time, whereby the battery blocks B1, B2, B3 are selected, and the capacitor C1 is charged with the integrated voltage Vb13 (=Vb1+Vb2+Vb3) of the battery blocks B1, B2, B3. Then, the switches SW1, SW4 are opened and the switches SWc, SWd are closed, whereby the charge voltage of the capacitor C1, that is, the integrated voltage Vb13 of the battery blocks B1, B2, B3 is input to the voltage detection unit 25. The voltage detection unit 25 calculates the battery voltages Vb1, Vb2 of the battery blocks B5, B2, based on the input integrated voltage Vb13. More specifically, the voltage detection unit 25 divides the integrated voltage Vb13 by "3" to define the result as the battery voltages Vb1, Vb2. Alternatively, the battery voltage Vb3 of the battery block B3 may be determined before the voltage detection unit 25 subtracts the Vb3 from the integrated voltage Vb13 and divides the result of the subtraction by "2" to define the result of the dividing as battery voltages Vb1, Vb2.

It should be noted that as the voltage detection unit 25 is formed using an operational amplifier, for example, should an integrated voltage higher than the voltage in battery block units be input via the first sample switch 23 to the voltage detection unit 25, a large current may flow into the voltage detection unit 25, damaging the operational amplifier or the like. In view of the above, in this embodiment, in inputting the integrated voltage into the voltage detection unit 25, the second sample switch 24, which has a resistance value higher than that of the first sample switch 23, is selected so that a large current is prevented from flowing into the voltage detection unit 25.

Figure 3C:
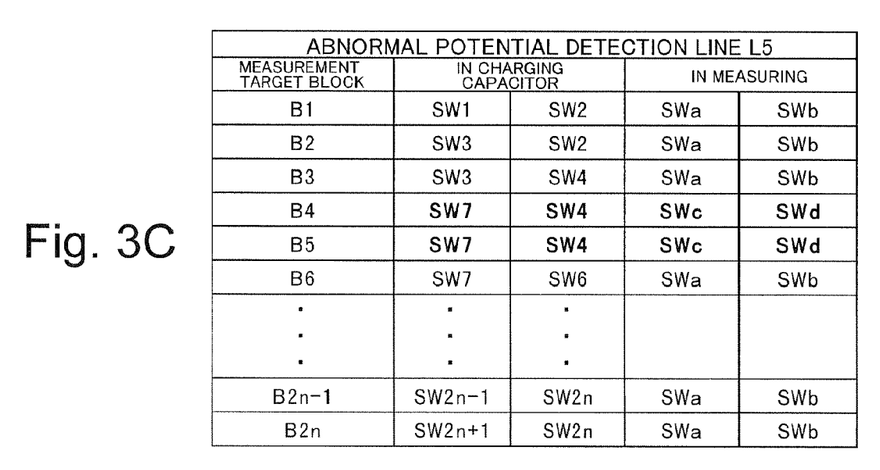
FIG. 3C is a diagram showing one example of a switch control map to be referred to by the switch control unit when any abnormality, such as disconnection or the like, occurs on a specific potential detection line.

FIG. 3C shows a switch control map to be referred to by the switch control unit 26 when the battery voltages of the battery blocks B4, B5 cannot be measured due to the occurrence of an abnormality, such as disconnection or the like, of the potential detection line La5 and/or the potential detection line Lb5. With the switch control map shown in FIG. 3C referred to, the integrated voltages Vb46 of the battery blocks B4, B5, B6 are input to the voltage detection unit 25. Therefore, the voltage detection unit 25 can calculate the respective battery voltages of the battery blocks B4, B5 based on the integrated voltage Vb46.

As described above, in this embodiment, when direct measurement of a battery voltage in battery block units is not achievable, the integrated voltage of a plurality of battery blocks is measured, and a battery voltage is measured in battery block units based on the integrated voltage. This arrangement makes it possible, even if the potential detection line is disconnected or the like, to measure the battery voltage in battery block units, and thus to continue calculation or the like of the capacitance of the battery block, using the battery voltage of each battery block as a parameter, for example. That is, even when direct measurement of a battery voltage in battery block units cannot be achieved due to disconnection or the like occurring on the potential detection line, charge/discharge of the secondary battery can be continued. Therefore, even when direct measurement of a battery voltage in battery block units cannot be achieved, the electric vehicle can keep running.

Figure 4:
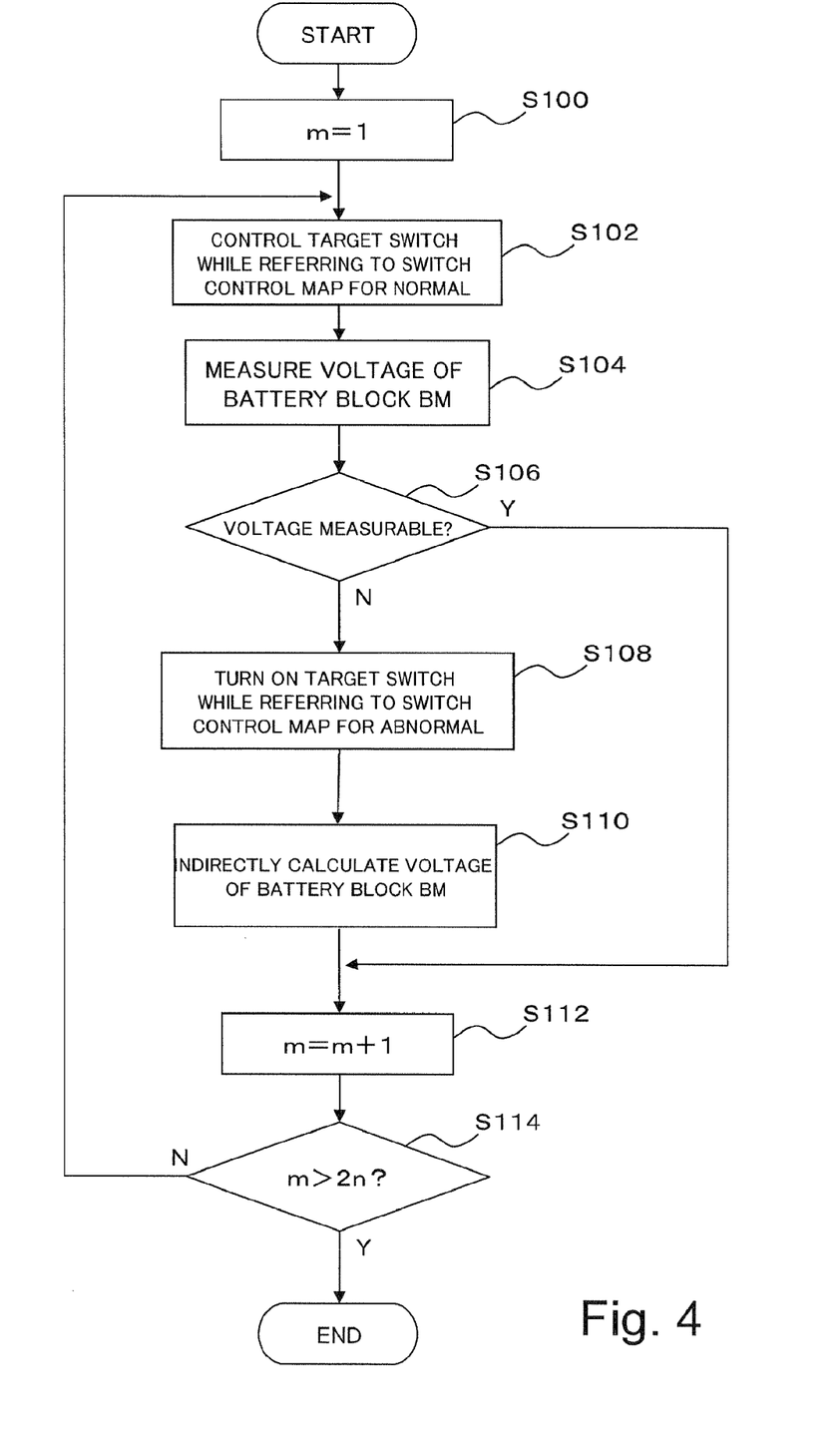
FIG. 4 is a flowchart showing a process procedure to be followed by a battery ECU to measure the battery voltage of battery blocks constituting a secondary battery.

FIG. 4 is a flowchart of a process for the battery ECU 20 measuring the battery voltages of the battery blocks forming the secondary battery 10 when the electric vehicle keeps running.

Specifically, the battery ECU 20 initially substitutes "1" as an initial value for m (S100), then carries out on/off control relative to the target switch SW with reference to the switch control map for use in a normal state, such as is shown in FIG. 3A (S102), and attempts to measure the voltage of the battery block $B_m$ (S104). When the voltage of the battery block $B_m$ can not be measured (determination result being negative "N" at step S106), the battery ECU 20 carries out on/off control of the target switch SW with reference to the switch control map, such as is shown in FIG. 3B or 3C, corresponding to the battery block $B_m$ for which voltage cannot be measured (S108), and measures the voltage of the battery block $B_m$ (S110). That is, the integrated voltage of the three battery blocks (for example, $B_m-1$, $B_m$, $B_m+1$) including the battery block $B_m$ are measured, and the battery voltage $Vb_m$ of the battery block $B_m$ is indirectly measured based on the integrated voltage.

After direct or indirect measurement of the battery voltage $Vb_m$ of the battery block $B_m$, as described above, the battery ECU 20 increments the value of m (S112). When the incremented value of m is not in excess of 2n, or the total number of the battery blocks (the determination result being negative "N" at step S114), which means incompletion of the voltage measurement of all target battery blocks, the process at step S102 and thereafter is repeated.

As described above, according to this embodiment, even though direct measurement of a battery voltage in battery block units is not achievable due to disconnection or the like of the potential detection line, the battery voltage of the battery block can be indirectly measured based on the integrated voltage of a plurality of battery blocks including the battery block for which voltage cannot be directly measured. That is, in this embodiment, even when the inter-terminal voltage of the measurement target battery block cannot be directly measured, the inter-terminal voltage of the measurement target battery block can be calculated based on the integrated voltage of a plurality of battery blocks including the measurement target battery block. With the above, the inter-terminal voltage of the measurement target battery block can be indirectly measured.

It should be noted that although an example in which the battery voltage of the measurement target battery block is indirectly measured based on the integrated voltage of three blocks, including the measurement target battery block, when the battery voltage of the measurement target battery block cannot be directly measured, due to the structure of the circuit battery, is described in the above-described embodiment, the number of battery blocks for which integrated voltage is measured, that is, the minimum number of battery blocks for which integrated voltage is detectable, is not limited to "3". For example, suppose that the voltage detection unit 25 can detect the integrated voltage of two serially connected battery blocks among the battery blocks forming the secondary battery 10. In this case, the battery voltage of the measurement target battery block may be indirectly measured based on the integrated voltage of two battery blocks including the measurement target battery block. Also, the minimum number of battery blocks for which integrated voltage is detectable includes a predetermined unit minimum number. That is, in the circuit structure in this embodiment, for example, the detectable minimum number may be "5" or the like. Further, the number of disconnected potential detection lines is not limited to one. Therefore, the integrated voltage of the battery block group comprising a predetermined number (for example, "3") of battery blocks including the measurement target battery block may not be always detected. In view of the above, for example, the number of battery blocks which constitute the battery block group may be increased in a stepwise manner until the integrated voltage becomes detectable.

It is described in the above-described embodiment that the voltage detection unit 25 divides the integrated voltage of three battery blocks by "3" to define the result of the dividing as a battery voltage in battery block units. Alternatively, the voltage detection unit 25 mat subtract the battery voltage of one battery block for which battery voltage can be directly measured from the integrated voltage of three battery blocks, then divide the result of the subtraction by "2", and define the result of the dividing as the battery voltage of the respective two remaining battery blocks.

It should be noted here that as the result obtained as described above is merely an approximate battery voltage of the battery block, it is thus inferior in accuracy to the directly measured battery voltage. This means that the measured battery voltage of the battery block may be lower than the actual value. In such a case, charging control based on a measured battery voltage that lower than the actual value may result in excessive charging of the secondary battery. In order to address the above, correction may be made in controlling charging of the secondary battery by adding a predetermined coefficient to the battery voltage obtained based on the integrated voltage of a plurality of battery blocks, as described above, so that a slightly larger voltage value is obtained, and the thus corrected battery voltage may be used as the battery voltage of the battery block. Such correction can prevent excessive charging. Meanwhile, the measured battery voltage of the battery block may be higher than the actual value. In such a case, charging control based on a measured battery voltage that is higher than the actual value may result in excessive discharging of the secondary battery. In view of the above, correction may be made in controlling discharging of the secondary battery in the opposite manner from that in charging, by subtracting a predetermined coefficient from the battery voltage obtained based on the integrated voltage of a plurality of battery blocks so that a slightly smaller voltage value is obtained, and the thus corrected battery voltage may be used as the battery voltage of the battery block.

What is claimed is:

1. A voltage measurement device for measuring an inter-terminal voltage of each of a serially connected plurality of battery blocks in battery block units, comprising:
   a plurality of potential detection lines respectively connected to both ends of the plurality of battery blocks and respective connection points between the respective battery blocks;
   a first multiplexer circuit for selectively connecting any of one of odd-numbered potential detection lines of the potential detection lines, counted from one end of the plurality of battery blocks, to a first potential detection terminal;
   a second multiplexer circuit for selectively connecting any one of even-numbered potential detection lines of the potential detection lines, counted from the one end, to a second potential detection terminal;
   a voltage detection unit for detecting the inter-terminal voltage of a measurement target battery block, and for detecting, only if the inter-terminal voltage of the measurement target battery block can not be detected, an integrated voltage of a battery block group comprising the plurality of battery blocks including the measurement target battery block, and calculating the inter-terminal voltage of the measurement target battery block based on a number of the battery blocks included in the battery block group and the integrated voltage; and
   a switch control unit that commands a first switch to close on an odd-numbered potential detection line and a second switch to close on an even-numbered potential detection line separated from the even-numbered potential detection line by at least three or more battery blocks to detect the integrated voltage of the three or more battery blocks.

2. The voltage measurement device according to claim 1, wherein the battery block group comprises a minimum number of battery blocks for which voltage can be detected.

3. The voltage measurement device according to claim 2, wherein only if the inter-terminal voltage of the measurement target battery block can not be detected, the voltage detection unit connects the odd-numbered potential detection line and the even-numbered potential detection line, which are respectively connected to both ends of the battery block group, to the first potential detection terminal and the second potential detection terminal via the first multiplexer circuit and the second multiplexer circuit, respectively, to detect a potential difference between the first potential detection terminal and the second potential detection terminal, to thereby detect the integrated voltage, and the minimum number of battery blocks for which voltage can be detected is an odd number equal to or larger than three.

4. An electric vehicle, comprising:
   a secondary battery formed using a plurality of serially connected battery blocks;
   a motor generator for receiving power from the secondary battery and driving the electric vehicle to run;
   a plurality of potential detection lines respectively connected to both ends of the plurality of battery blocks and respective connection points between the respective battery blocks;
   a first multiplexer circuit for selectively connecting any of one of odd-numbered potential detection lines of the potential detection lines, counted from one end of the plurality of battery blocks, to a first potential detection terminal;

a second multiplexer circuit for selectively connecting any one of even-numbered potential detection lines of the potential detection lines, counted from the one end, to a second potential detection terminal;

a voltage measurement device for detecting an inter-terminal voltage of a measurement target battery block, and for detecting, only if the inter-terminal voltage of the measurement target battery block can not be detected, an integrated voltage of a battery block group comprising the plurality of battery blocks including the measurement target battery block, and calculating the inter-terminal voltage of the measurement target battery block based on a number of the battery blocks included in the battery block group and the integrated voltage, and a control unit for controlling such that power supply from the secondary battery to the motor generator can be continued, based on the inter-terminal voltage of each battery block, supplied from the voltage measurement device, when the inter-terminal voltage of the measurement target battery block can be calculated based on the number and the integrated voltage even though the voltage measurement device can not to detect the inter-terminal voltage of the measurement target battery block, and a switch control unit that commands a first switch to close on an odd-numbered potential detection line and a second switch to close on an even-numbered potential detection line separated from the even-numbered potential detection line by at least three or more battery blocks to detect the integrated voltage of the three or more battery blocks.

* * * * *

UNITED STATES PATENT AND TRADEMARK OFFICE
CERTIFICATE OF CORRECTION

| | | |
|---|---|---|
| PATENT NO. | : 7,999,553 B2 | |
| APPLICATION NO. | : 11/938193 | |
| DATED | : August 16, 2011 | |
| INVENTOR(S) | : N. Yamabe | |

It is certified that error appears in the above-identified patent and that said Letters Patent is hereby corrected as shown below:

| COLUMN | LINE | ERROR |
|---|---|---|
| 10 (Claim 4) | 8 | "device can not to detect" should read --device can not detect-- |

Signed and Sealed this
Third Day of January, 2012

David J. Kappos
*Director of the United States Patent and Trademark Office*